United States Patent
Ferriggi, Jr.

(10) Patent No.: US 9,132,767 B2
(45) Date of Patent: Sep. 15, 2015

(54) CARGO CATCH

(71) Applicant: Richard H. Ferriggi, Jr., East Northport, NY (US)

(72) Inventor: Richard H. Ferriggi, Jr., East Northport, NY (US)

( * ) Notice: Subject to any disclaimer, the term of this patent is extended or adjusted under 35 U.S.C. 154(b) by 0 days.

(21) Appl. No.: 14/660,271

(22) Filed: Mar. 17, 2015

(65) Prior Publication Data

US 2015/0197178 A1 Jul. 16, 2015

Related U.S. Application Data

(63) Continuation-in-part of application No. 13/875,010, filed on May 1, 2013, now Pat. No. 8,998,547.

(51) Int. Cl.
*B60P 7/14* (2006.01)
*B60P 1/00* (2006.01)

(52) U.S. Cl.
CPC .. *B60P 7/14* (2013.01); *B60P 1/006* (2013.01)

(58) Field of Classification Search
CPC ........ B60P 7/14; B60P 7/0823; B60P 7/0876; B60P 1/006
USPC ............... 410/34, 96, 97, 100, 103, 117, 118, 410/121, 129, 140
See application file for complete search history.

(56) References Cited

U.S. PATENT DOCUMENTS

| | | | |
|---|---|---|---|
| 3,978,996 | A | 9/1976 | Oltrogge |
| 4,770,579 | A | 9/1988 | Aksamit |
| 4,964,771 | A | 10/1990 | Callihan |
| 5,452,973 | A | 9/1995 | Arvin |
| 5,509,764 | A | 4/1996 | Shives |
| 5,915,911 | A | 6/1999 | Hodgetts |
| 5,997,233 | A | 12/1999 | Whatley et al. |
| 6,086,313 | A | 7/2000 | Plaehn |
| 6,524,043 | B2 | 2/2003 | Earle et al. |
| 6,692,204 | B1 * | 2/2004 | Ricard .......................... 410/121 |
| 6,939,096 | B1 | 9/2005 | Cline et al. |
| 7,111,886 | B1 | 9/2006 | Miller et al. |
| 7,175,218 | B1 | 2/2007 | Keene |
| 7,195,432 | B2 | 3/2007 | Earle et al. |
| 7,488,021 | B1 | 2/2009 | Roos et al. |
| 8,272,821 | B2 | 9/2012 | Digman |
| 8,998,547 | B2 * | 4/2015 | Ferriggi, Jr. .................. 410/118 |
| 2004/0134953 | A1 | 7/2004 | Perez |
| 2011/0243697 | A1 | 10/2011 | Braun et al. |

* cited by examiner

*Primary Examiner* — Stephen Gordon
(74) *Attorney, Agent, or Firm* — Scully, Scott, Murphy & Presser, P.C.

(57) ABSTRACT

A cargo holding apparatus for securing cargo in a pickup truck cargo bed and facilitating unloading of the cargo is provided. The apparatus has a holding element, a pair of straps each attachable to a respective support member of the holding element, and a pair of clamping members attached to a left side wall and a right side wall of the cargo bed, respectively, at a position adjacent to a rear wall of the cargo bed. Each strap is fed through a respective clamping member. The clamping member securely holds the strap when in an engaged aspect and allows the strap to slide unrestricted when in a disengaged aspect.

12 Claims, 5 Drawing Sheets

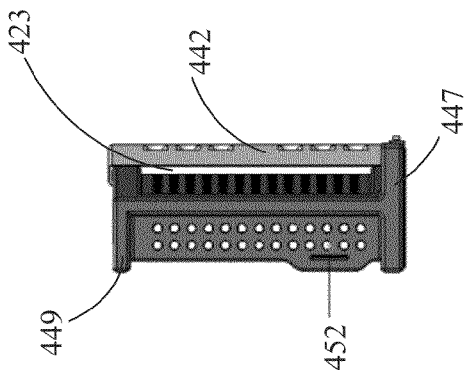
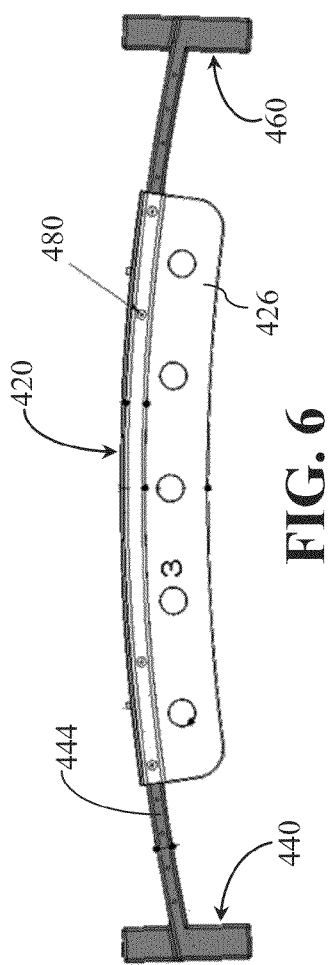
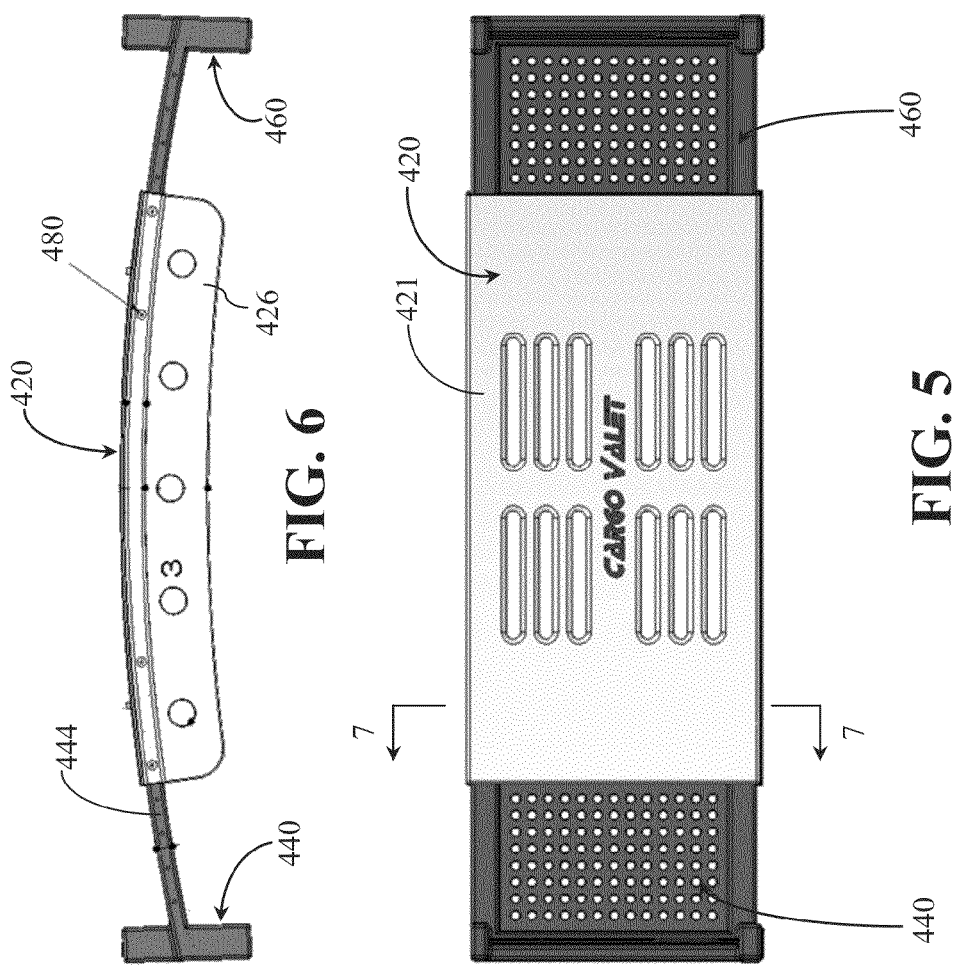
FIG. 7
FIG. 6
FIG. 5

CARGO CATCH

CROSS-REFERENCE TO RELATED APPLICATION

This application is a continuation-in-part application of co-pending application U.S. application Ser. No. 13/875,010, filed on May 1, 2013, the complete disclosure of which is hereby incorporated by reference for all purposes.

BACKGROUND

This disclosure relates to pickup truck cargo bed accessories. More specifically, the disclosure relates to a system for holding cargo in place and providing easy unloading of the cargo.

Pickup trucks are widely used for commercial purposes where the cargo bed is utilized to haul construction supplies, machinery, and other bulky or large quantity materials. Pickup trucks are also used for recreational and personal purposes. The cargo bed of a pickup truck provides extended hauling capacity. However, because of the depth of the cargo bed, objects placed in the cargo bed have a tendency to shift around. The movement of objects in the cargo bed can result in damage to the objects or even the walls of the cargo bed. Additionally, the depth and height of the cargo bed make retrieval of objects difficult, especially, if the objects are small or have shifted towards the cab portion of the pickup truck.

In an effort to minimize shifting of objects, devices are available for tying down or holding objects against a wall of the cargo bed. Most such devices require extensive modification of the cargo bed, such as by installing rail systems and the like. Moreover, most devices for holding objects in place are configured for holding the objects against the wall closest to the cab of the pickup truck, i.e., farthest away from the lift gate. In this configuration, it is difficult to retrieve objects from the cargo bed.

SUMMARY

According to an exemplary aspect of the disclosure, an apparatus for securing and facilitating unloading of cargo in a storage area (such as, a cargo bed) of a vehicle (such as, a pickup truck) is provided. The apparatus includes a holding element. The holding element includes a main body that includes a left portion and a right portion. The left portion defines a first opening and the right portion defines a second opening. The holding element further includes a left support member that is at least partially moveable within the first opening and a right support member that is at least partially moveable within the second opening, such that both the left support member and the right support member are retractable with respect to the main body. The apparatus also includes a pair of straps, each attachable to a respective support member and dimensioned to extend at least a length of the storage area. The apparatus further includes a pair of clamping members attachable to a left side wall and a right side wall of the storage area, respectively, at a position adjacent to a rear wall of the storage area. Each strap is fed through a respective clamping member. The respective clamping member securely holds the strap when in an engaged aspect and allows the strap to slide unrestricted when in a disengaged aspect.

BRIEF DESCRIPTION OF THE DRAWINGS

These and other features, aspects, and advantages of the disclosure will become better understood with regard to the following description, appended claims, and accompanying drawings wherein:

FIG. 5 illustrates a front elevation view of the embodiment of FIG. 4;

FIG. 6 illustrates a top plan view of the embodiment of FIG. 4; and

FIG. 7 illustrates a sectional view along lines 7-7 of FIG. 6.

DETAILED DESCRIPTION OF EXEMPLARY EMBODIMENTS

Figure 1:
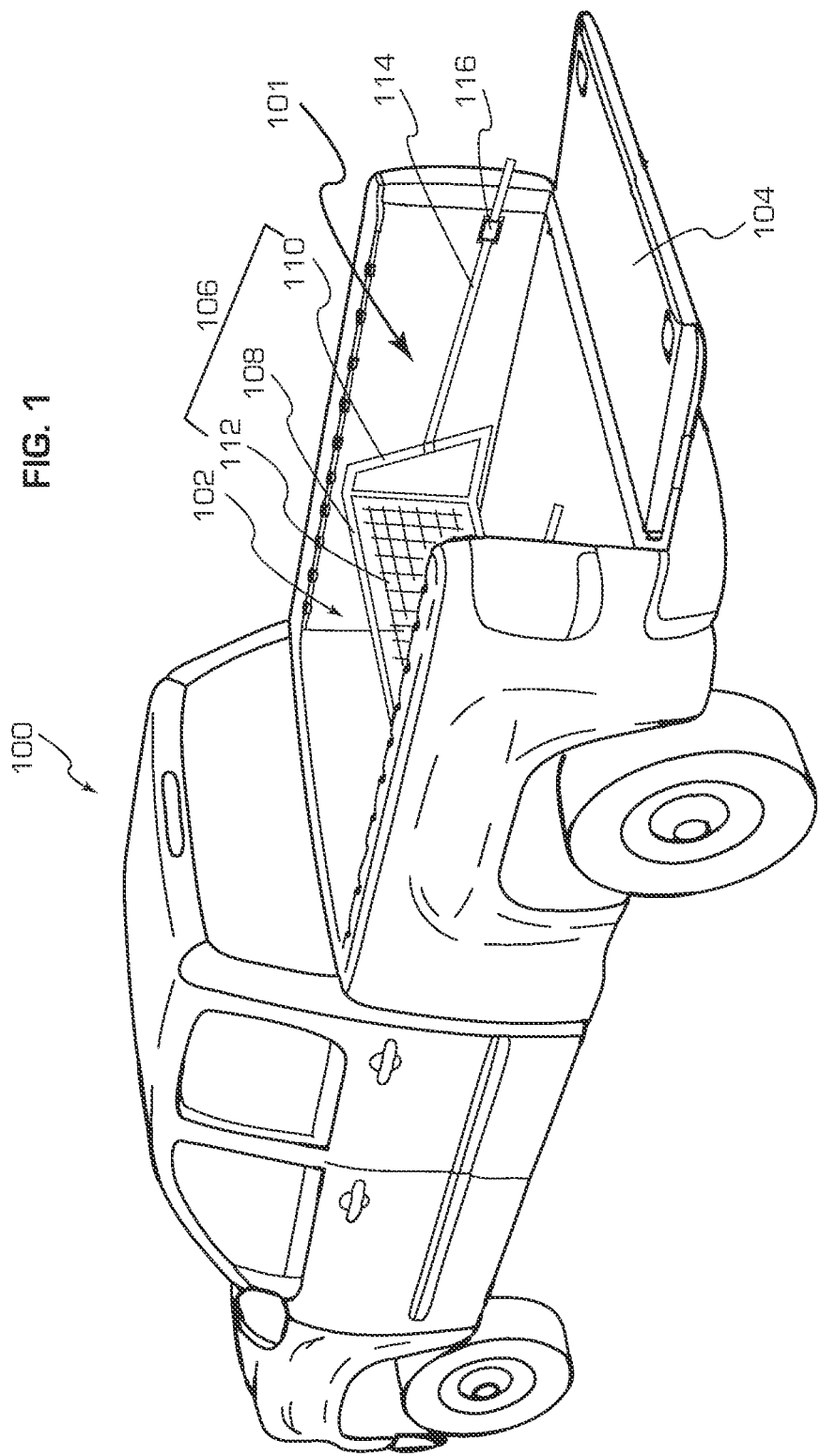
FIG. 1 illustrates a perspective view of an exemplary embodiment of the present invention installed in a pickup truck cargo bed.

For clarity, the disclosure applies like reference numerals to like structures throughout the figures. Moreover, terms used for structures and elements of the embodiments are given their common meaning unless otherwise defined herein.

Referring to FIG. 1, an apparatus 101 for securing and facilitating unloading of one or more cargo in a storage area of a vehicle, according to an embodiment of the disclosure, is shown. For example, the cargo can be containers and the vehicle can be a pickup truck 100. As shown, the pickup truck 100 includes a cargo bed area 102 for storing the containers, and a lift gate 104 disposed at a rear end of the cargo bed 102. A holding frame 106 is placed in the cargo bed 102. The holding frame 106 is formed of a cross member 108 defining a top and bottom of the holding frame 106. Additionally, side support members 110 are disposed at each free end of the cross member 108. The combination of the cross member 108 and the side support members 110 define a rectangular space that spans the width of the cargo bed 102. Moreover, the rectangular space is overlaid with a flexible screen 112.

With respect to this embodiment, the width direction of the cargo bed is intended to refer to the direction perpendicular to the front-back axis of the pickup truck 100. The depth direction is understood to refer to the direction along the front-back axis of the pickup truck 100.

The cross member 108 and the side support members 110 may be constructed of any appropriately rigid material. Some examples of appropriate materials include, but are not limited to, aluminum, steel, polycarbonate plastic, polyvinylchloride plastic, and carbon fiber. In an embodiment of the present invention, the cross member 108 and the side support members 110 have hollow circular cross-sections. Alternatively, the cross-sections of the cross member 108 and the side support members 110 may be hollow polygonal or triangular. Further, one or more of the cross member 108 and the side support members 110 may have a solid core rather than hollow. The cross member 108 is coupled to the side support member 110 at each end by means of well known techniques such as welding, epoxy, and treaded joints.

The flexible screen 112 is formed of any appropriately flexible material. Additionally, the flexible screen 112 may be formed of a material that is resilient. For example, nylon cord, vinyl, reinforced plastics, metal cables, and other man-made and natural fibers may be effectively used to form the flexible screen 112. The material forming the flexible screen 112 is woven together, i.e. strips or cords of the material are disposed vertically and horizontally between the cross members 108 and the side support members 110 and interwoven. The weave need not be tight. Rather, the weave in one embodiment may have voids of several inches vertically and horizontally. However, the voids should not be so large as to allow objects normally intended to be transported in the cargo bed to pass through the flexible screen 112 easily.

In addition, the apparatus 101 also includes a strap 114, formed of nylon, polyester or metallic material, which is attached to a point on each of the side support members 110. The strap is dimensioned to extend the entire depth of the cargo bed 102 with additional length extending beyond the rear end of the cargo bed 102.

The apparatus 101 further includes a clamping device 116 anchored to a left rear side and a right rear side of the cargo bed 102. In an embodiment of the present invention, the clamping device 116 is positioned near the lift gate 104 in the closed position. The clamping device 116 is configured and dimensioned to accept a free end of the strap 114. Additionally, in an engaged aspect, the clamping device 116 holds the strap 114 with sufficient force so as to prevent slippage of the strap 114 therethrough from the weight of objects being held by the present invention. Moreover, in a disengaged aspect, the clamping device 116 allows unrestricted sliding of the strap 114 therethrough.

Figure 2:
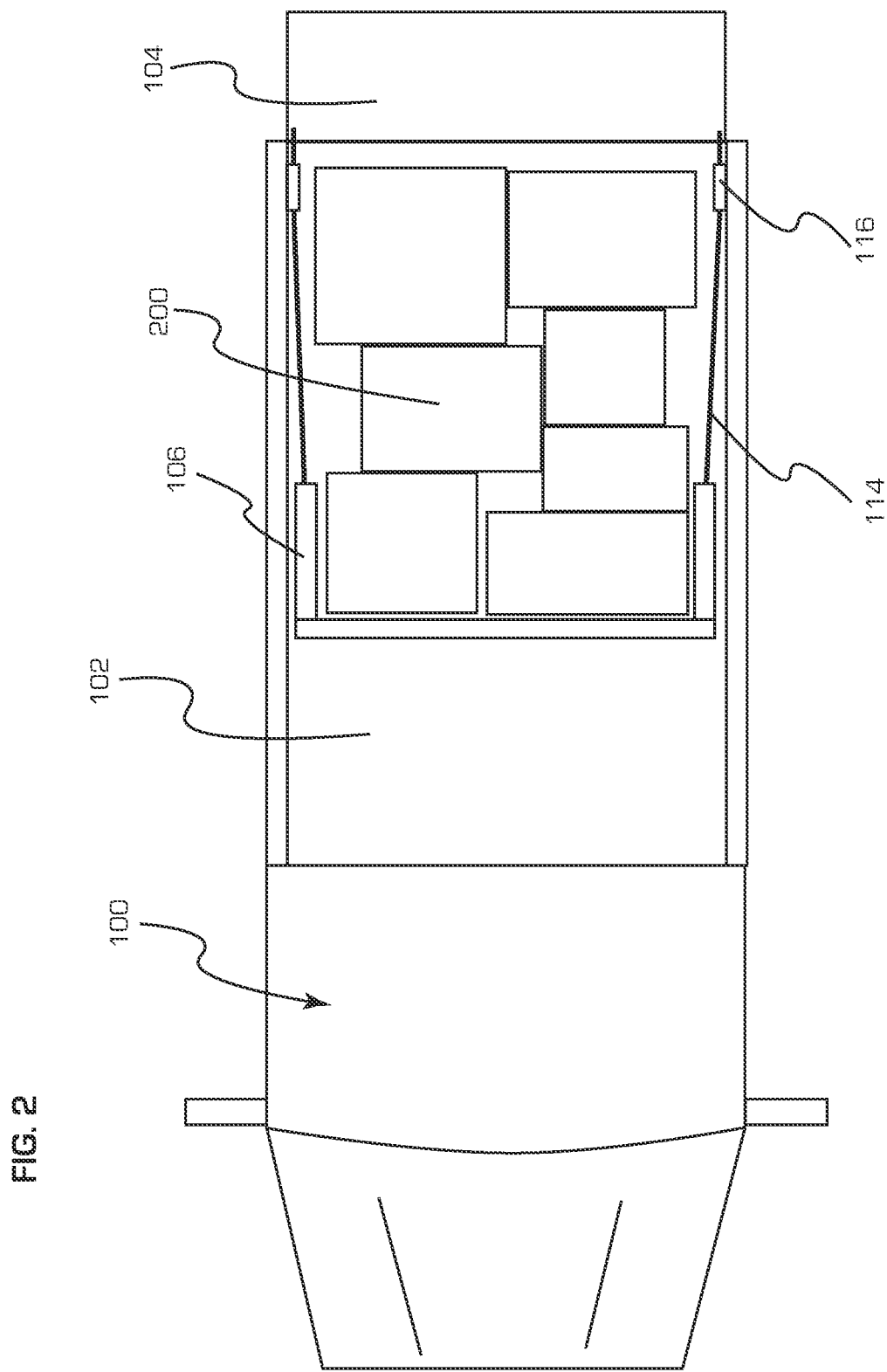
FIG. 2 illustrates a plan view of the embodiment in use.

Referring to FIG. 2, a plan view is shown of the embodiment installed in a cargo bed 102 of pickup truck 100. As shown, the holding frame 106 is disposed across the cargo bed 102. Moreover, a plurality of containers 200 are positioned between the holding frame 106 and the lift gate 104 when the lift gate is in a closed position. The straps 114 anchored by the clamping members 116, in an engaged aspect, hold the holding frame 106 against the plurality of containers 200 such that the containers 200 are restricted from moving along the depth direction of the cargo bed 102. When the clamping members 116 are in a disengaged aspect, the straps 114 can be freely pulled to move the holding frame 106 rearward, towards the lift gate 104 end of the cargo bed 102. The holding frame 106 is pressed against the containers 200 and the containers 200 are, in turn, pressed against the lift gate 104 when the lift gate 104 is in the closed position. Locking the clamping members 116 in the engaged aspect holds the straps 114, thus maintaining the pressing force on the containers 200 by the holding frame 106 at one side and the lift gate 104 at the other side. As a result, shifting of containers 200 held in the cargo bed 102 is reduced.

When the containers 200 are ready to be unloaded, the clamping members 116 are placed into the disengaged aspect and the straps 114 are further pulled rearward. Pulling the straps 114 causes the holding frame 106 to move rearward as well. With the lift gate 104 in the open position, the rearward motion of the holding frame 106 advances the containers 200 towards the lift gate 104, allowing an operator to easily reach the containers 200. The holding frame 106 is moved rearward until all the containers 200 have been moved to the edge of the lift gate 104 and removed from the cargo bed 102.

Figure 3:
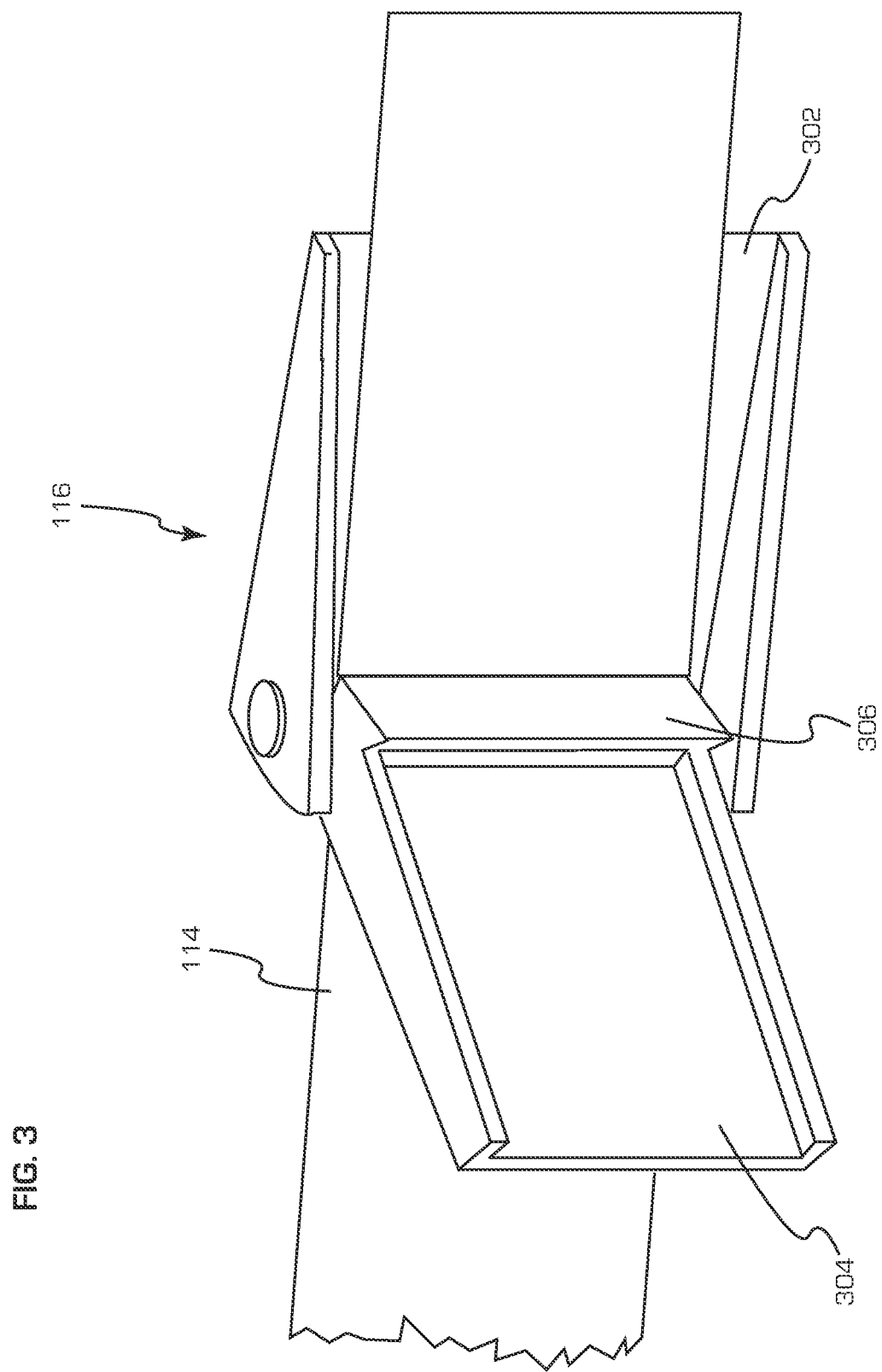
FIG. 3 illustrates a clamping device of the embodiment.

FIG. 3 shows an example of a clamping device 116. The clamping device can be secured or attached to a left side wall or a right side wall of the cargo bed. Alternative clamping devices, which have sufficient holding force when engaged to prevent slippage of the strap 114 while allowing unrestricted sliding of the strap 114 when the clamping device is disengaged, can be used. The example clamping device 116 includes a base plate 302 configured to be affixed to a vertical side panel of a cargo bed. Additionally, a handle lever 304 is rotatablely mounted to the base plate 302. The handle lever 304 includes an engaging portion 306 configured to provide a crimping force against the strap 114 when the handle lever 304 is rotated towards the base plate 302, thus placing the clamping device 116 in an engaged aspect. When the handle lever 304 is rotated into the position shown in FIG. 3, the clamping device 116 is in a disengaged aspect that allows the strap 114 to slide freely.

FIGS. 4-7 illustrate a holding element 400, which is an alternative embodiment of the holding frame 106 and can be used with the straps 114 and clamping devices 116 in lieu of the holding frame 106.

The holding element 400 has a width that can be manually adjusted. As a result, the same apparatus, having the holding element 400, can be installed and used with different vehicles that have a storage area (for example, cargo beds) of different widths.

The holding element 400 includes a main body 420, which includes a left portion 422 and a right portion 424 opposite the left portion 422 along the width direction of the apparatus. The left portion 422 defines a first opening 423 and the right portion 424 defines a second opening 425. Both openings can be in the shape of a slot, recess or cavity, which are dimensioned to allow slidable movement of a corresponding structure within the openings with respect to the left portion or the right portion. Optionally, the main body 420 includes a middle portion 421 provided between the left portion 422 and the right portion 424. The middle portion 412 can be solid or, alternatively, provided with a group of through openings in the shape of parallel slots. Optionally, the main body 420 also includes a bottom plate 426, which is provided at the bottom end of the main body 420 and extends substantially perpendicularly from the bottom end of the main body 420. The bottom plate 426 is properly dimensioned and structured to serve as an anti-tilting mechanism, such that undesirable tilting of the entire holding element 400 can be prevented. For example, the main body 420 can be integrally formed through an injection molding process to provide the hollow left and right portions and the solid or slotted middle portion, as shown and described. In addition, the dimensions of the first and second openings can be variable.

The holding element 400 further includes a left support member 440 and a right support member 460. The left support member 440 is configured to be at least partially moveable within the first opening 423 to allow the left support member 440 to be retractable with respect to the main body 420. The right support member 460 is configured to be at least partially moveable within the second opening 425 to allow the right support member 460 to be retractable with respect to the main body 420. As the left support member 440 and the right support member 460 are both removable/retractable with respect to the main body 420, the width of the holding element 400 can be adjusted. These features are advantageous at least because the adjustable width of the holding element 400 allows the same apparatus to be compatible and workable with vehicles having different storage dimensions, particularly, width of the storage area (for example, a cargo bed).

In the shown embodiment, the left support member 440 and the right support member 460 are structurally symmetric to one another; thus, the following description with respect to the left support member 440 and the first opening 423 is equivalently applicable to the right support member 460 and the second opening 425. However, structurally different left support member and right support member are within the scope of the disclosure, given that they can function equally as the structurally symmetric members.

Figure 4:
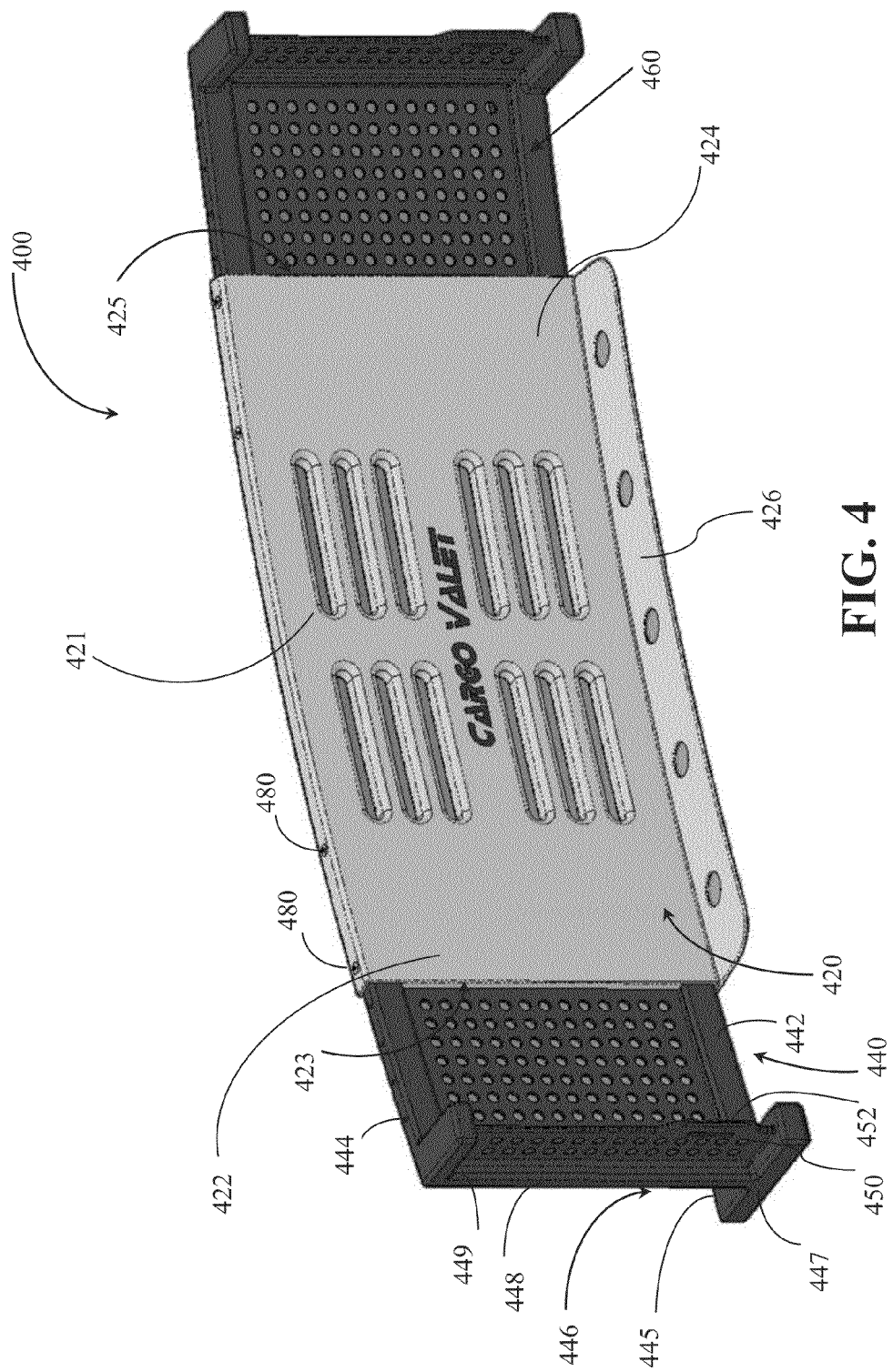
FIG. 4 illustrates a perspective view of another exemplary embodiment of the present invention, which can be used with the pickup truck cargo bed.

FIGS. 4-6 illustrate the holding member 400 when the holding element is fully extended to provide a maximum width thereof, in which configuration both the left support member 440 and the right support member 460 are at their most extended-out position but still maintain their attachment to the main body 420. Although not shown, the holding member 400 has a minimum width, when both the left support member 440 and the right support member 460 are fully retracted into the main body 420. The width of the holding member 400 is adjustable within the range from the minimum width to the maximum width.

The left support member 440 includes a first retractable portion 442, which is dimensioned to be at least partially movable within the first opening 423 to allow itself to be at least partially received by the left portion 422 of the main body 420. In the shown embodiment, the first retractable portion 442 is substantially rectangular shaped, including a frame structure and a web at least partially surrounded by the frame structure. The web can have a plurality of through holes, which can be circular.

At the top surface of the first retractable portion 442, a plurality of holes 444 are provided, which can be distributed along the top surface with an equal distance. One or more through holes 480, which are complementary to the holes 444, are provided through the top surface of the left portion 422 of the main body 420.

The holes 444 and the through holes 480 are configured to receive a fastener, when the first retractable portion 442 is moved in the left portion 422 of the main body 420 at a position where a hole 444 and a respective through hole 480 are aligned with each other. For example, both holes can have threads to receive a screw. As a result, the first retractable portion 442 can be selectively fixed to the main body 420. Moreover, the distribution of the holes and the distance between two adjacent holes can be advantageously calculated to provide a combination of various widths of the holding element 400, which would allow the apparatus to be used with most market-available vehicles. In operation, a user can first move at least one of the left support member 440 and the right support member 460 to achieve a desirable width of the holding element 400 by aligning a hole 444 and a respective through hole 480 and subsequently, fasten the support member(s) with the main body 420 through one or more fasteners. The holding element, once assembled to present the desirable width, exhibits certain integrity, such that the holding element can be used with vehicles without raising concerns that the different parts of the holding element may be separated from each other in use.

The left support member 440 also includes a first side support 446 that is formed angularly with respect to the first retractable portion 442. For example, the first side support 446 can be formed to extend along the depth direction of the vehicle, such as the pickup truck 100. The first side support 446 includes a first side frame 445 defined by a foot 447, a post 448 extending upright from the foot 447, and a top flange 449 that is substantially parallel to the foot 447. The first side support 446 also includes a first web 450 that is at least partially surrounded by the first side frame 445. The first web 450 has a first through opening 452, through which a respective strap passes. Thus, by manipulating the strap, the movement of the holding element 400 toward a rear wall of the storage area can be achieved and consequently, restriction of the movement of the cargo between the holding element and the rear wall of the storage area can also be achieved.

Both the web 450 of the first side support 446 and the web of the first retractable portion 442 can have through openings formed therein. These through openings can be substantially circular or of any other suitable shapes. The provision of these through openings would reduce the weight of the entire holding element and also the consumption of the raw material, without compromising the integrity and functionality of the holding element. For example, both the first side support 446 and the first retractable portion 442 can be formed integrally through an injection molding process.

While the embodiments of the present invention is described above as applicable to pickup trucks, they can be readily applied to other types of vehicles with large cargo holding areas as well, such as cargo vans, mini vans, sport utility vehicles, and cargo trailers.

In an embodiment of the present invention, the holding frame is dimensioned to have a height equivalent to the height of the side walls of the cargo bed measured inside the cargo bed, such that the top surface of the cargo bed side walls and the top surface of the holding frame are coplanar.

In another embodiment, the holding frame has a height less than the height of the cargo bed side walls. In this embodiment, long cargo, such as lumber can be rested on the top surface of the holding frame while still being encircled by the walls of the cargo bed.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An apparatus for securing and facilitating unloading of cargo in a storage area of a vehicle, the apparatus comprising:
   a holding element comprising:
      a main body comprising a left portion and a right portion, said left portion defining a first opening, said right portion defining a second opening, and
      a left support member at least partially moveable within the first opening and a right support member at least partially moveable within the second opening, such that both the left support member and the right support member are retractable with respect to the main body;
   a pair of straps, each attachable to a respective one of the support members, the straps being dimensioned to extend at least a length of the storage area; and
   a pair of clamping members attachable to a left side wall and a right side wall of the storage area, respectively, at a position adjacent to a rear wall of the storage area, each strap being fed through a respective one of the clamping members, the respective clamping member securely holding the respective strap when in an engaged aspect and allowing the strap to slide unrestricted when in a disengaged aspect.

2. The apparatus according to claim 1, wherein the holding element is configured to be movably positioned within the storage area, the storage area having a width extending in a direction of a wheel axle of the vehicle and a depth extending perpendicular to the width, and wherein the holding element extends in the width direction and the straps extend in the depth direction toward the rear wall of the storage area.

3. The apparatus according to claim 2, wherein the holding member is dimensioned to span the width of the storage area.

4. The apparatus according to claim 1, wherein the main body comprises an anti-tilt plate provided at a bottom end of the main body, said anti-tilt plate extending substantially perpendicularly from the bottom end.

5. The apparatus according to claim 1, wherein the left support member comprises: a first retractable portion that is at least partially movable within the first opening; and a first side support that is angularly formed with respect to the first retractable portion.

6. The apparatus according to claim 5, wherein the first retractable portion has a plurality of holes each configured to receive a fastener when the first retractable portion is at least partially received within the left portion of the main body through the first opening, such that the first retractable portion and the main body can be selectively fixed to each other.

7. The apparatus according to claim 5, wherein the first side support comprises a first side frame and a first web at least partially surrounded by the first side frame, the first web defining a first through opening through which a respective one of the straps passes.

8. The apparatus according to claim 1, wherein the right support member comprises: a retractable portion that is at least partially movable within the second opening; and a side support that is angularly formed with respect to the retractable portion.

9. The apparatus according to claim 8, wherein the retractable portion has a plurality of holes each configured to receive a fastener when the retractable portion is at least partially received within the right portion of the main body through the second opening, such that the retractable portion and the main body can be selectively fixed to each other.

10. The apparatus according to claim 8, wherein the side support comprises a side frame and a second web at least partially surrounded by the side frame, the web defining a second through opening through which a respective one of the straps passes.

11. The apparatus according to claim 1, wherein the pair of straps are configured to restrict movement of the cargo between the holding element and the rear wall of the storage area, when the clamping members are in the engaged aspect.

12. The apparatus according to claim 1, wherein the pair of straps are configured to allow movement of the holding element toward the rear wall of the storage area, when the clamping members are in the disengaged aspect.

* * * * *